US005589667A

United States Patent [19]
Tsukazaki et al.

[11] Patent Number: 5,589,667
[45] Date of Patent: Dec. 31, 1996

[54] REMOVABLE CORE FOR PRE-STRETCHED TUBE

[75] Inventors: Tomio Tsukazaki, Machida; Tsunehisa Nakamura, Tokyo, both of Japan

[73] Assignee: Minnesota Mining and Manufacturing Company, Saint Paul, Minn.

[21] Appl. No.: 302,821

[22] PCT Filed: Apr. 2, 1993

[86] PCT No.: PCT/US93/03139

§ 371 Date: Sep. 14, 1994

§ 102(e) Date: Sep. 14, 1994

[87] PCT Pub. No.: WO93/22816

PCT Pub. Date: Nov. 11, 1993

[30] Foreign Application Priority Data

Apr. 28, 1992 [JP] Japan ..................... 4-109374
May 8, 1992 [JP] Japan ..................... 4-116249

[51] Int. Cl.⁶ .................................. H01B 7/00
[52] U.S. Cl. ........................... 174/135; 174/DIG. 8
[58] Field of Search ..................... 174/135, DIG. 8, 174/84 R; 428/34.9, 36.9, 161, 163, 167; 29/235, 450, 868; 285/381 R

[56] References Cited

U.S. PATENT DOCUMENTS 3,515,798  6/1970  Sievert ........................ 174/135
4,735,836  4/1988  Giebel et al. ............. 174/DIG. 8 X

FOREIGN PATENT DOCUMENTS 3-28387  3/1991  Japan ..................... C23G 5/02

Primary Examiner—Hyung S. Sough
Attorney, Agent, or Firm—Gary L. Griswold; Walter N. Kirn; Jack V. Musgrove

[57] ABSTRACT

A removable core for a pre-stretched elastomeric tube includes a serpentine rather than helical arrangement for break lines around the core which permits the core to be withdrawn in one continuous pulling operation rather than the intermittent, rotating operation required in the past.

8 Claims, 5 Drawing Sheets

5,589,667

REMOVABLE CORE FOR PRE-STRETCHED TUBE

TECHNICAL FIELD OF THE INVENTION

The present invention relates to a pre-stretched elastomeric tubing (hereinafter PST) mounted on a plastic core which can be removed to allow the PST to contract into contact with an object to be covered by the tube.

BACKGROUND OF THE INVENTION

One method of insulating and environmentally protecting a connector for a power cable or other cable is by use of a contractible insulating tube expanded to fit over the outer surface of a hollow cylindrical core. The tube and core are slid over one cable end and the cables connected by means of the connector. The tube and core are then repositioned over the connector area and the hollow cylindrical core is pulled out so that the expanded insulating tube may contract into contact with the connector and cables.

U.S. Pat. No. 3,515,798, assigned to the assignee of the present invention and incorporated by reference herein, describes a one-piece, rigid, plastic core having interconnected adjacent coils in a closed helix configuration. One end of the core is partially unwound and led back through the core so that pulling on this end will cause the core to unwind and allow the tube to contract. Because the core is helically wound, the core length as it is extracted through the space between the core and the object over which the core has been positioned must be rotated around the object as the core end is pulled. This is cumbersome and does not permit the use of automation to remove the core as the machine cannot release the core on one side of the object and regrasp it on the other side of the object.

Japanese Utility Model Unexamined publication No. 3-28387 describes a straight pull-out core which overcomes the aforesaid drawback. The core, however, poses problems in that the core ribbon to be broken when pulled out straight is secured with multiple thin ribs. Therefore, when a tightening force is increased due to contraction of a rubber elastic body mounted on the core or an ambient temperature rises, the material strength is lowered, and thus the shallow ribs may break and crush the core. When the ribs are made thicker to increase the strength, the core ribbon becomes harder to pull out, and this deteriorates the workability.

SUMMARY OF THE INVENTION

The object of the present invention is to provide a PST core that is difficult to crush and which may be removed without the necessity of rotating the core end around the object over which the core and the tube were positioned.

In an effort to achieve the above object, the present invention provides a core having hairpin return sections for reversing the direction of separation of the core strip as it is withdrawn. Thus, the core strip unwinds from the core in one direction for a portion of the circumference of the core and then reverses direction to unwind from the core in the opposite direction for an equal portion of the circumference of the core. This arrangement thereby permits the entire core to be withdrawn from the tube without releasing the core strip once pulling has begun or rotating the core strip around the object to be covered by the tube.

More particularly, the present invention provides a removable core for supporting a pre-stretched elastomeric tube in a radially-expanded condition which includes a flexible sheet having opposite edges which include means for interlocking the opposite edges to maintain the sheet in a cylinder; the sheet having a series of substantially parallel lines of localized weakening extending from one of the opposite edges to a point near but short of the other of the opposite edges, with successive lines extending from alternate edges of the sheet to define a strip beginning at a free end and continuing in a serpentine length between and around consecutive lines so that pulling the free end will cause the strip to separate along the lines and permit the core to be removed from the tube without coiling of the strip.

One removable core according to the present invention includes a Joint formed by matching multiple projections which alternately project outward from the outer edges of the core and interlock to support one another. When a PST is mounted on the core, the PST core will not be crushed by the contacting force of the PST tube but will maintain a cylindrical shape. When the end of the core is pulled, the core reverses the breaking direction by 180° at each return section, and this permits a straight pull-out.

In the terminal section of a hairpin return section at which stress is most likely to be concentrated, an opening is formed to communicate with the line of weakening, whereby stress in the terminal section occurring when the core strip is pulled is dispersed to prevent the strip from breaking. Moreover, the opening may be surrounded with a thickened section, which also helps prevent the strip from breaking.

Another embodiment of the invention includes cooperative fittings at each opposite edge which interlock to maintain the sheet in a cylinder. The preferred fitting consist of a projection extending from one edge which mates with a socket formed in the opposite edge.

BRIEF DESCRIPTION OF THE DRAWINGS

The present invention will be more thoroughly described with respect to the accompanying drawings, wherein like numbers refer to like parts in the several views, and wherein.

DESCRIPTION OF THE PREFERRED EMBODIMENTS

Figure 1:
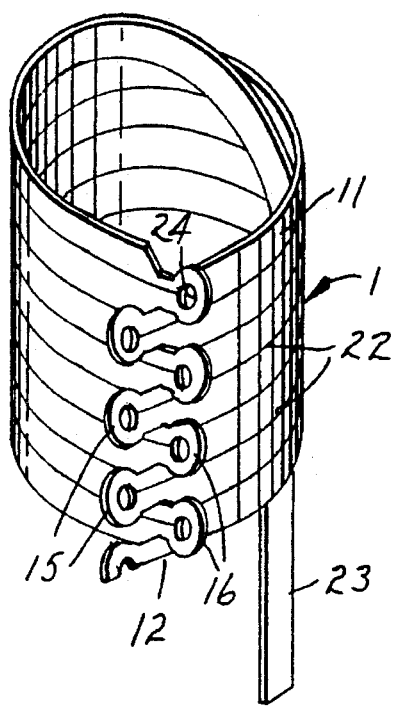
FIG. 1 is a perspective view of a first embodiment of a removable core of the present invention.

In the embodiment shown in FIG. 1, a removable PST core 1 is shaped into a cylinder by uniting the edges of a rectangular (or square) sheet 11 made of a flexible material at a joint 12.

Figure 2:
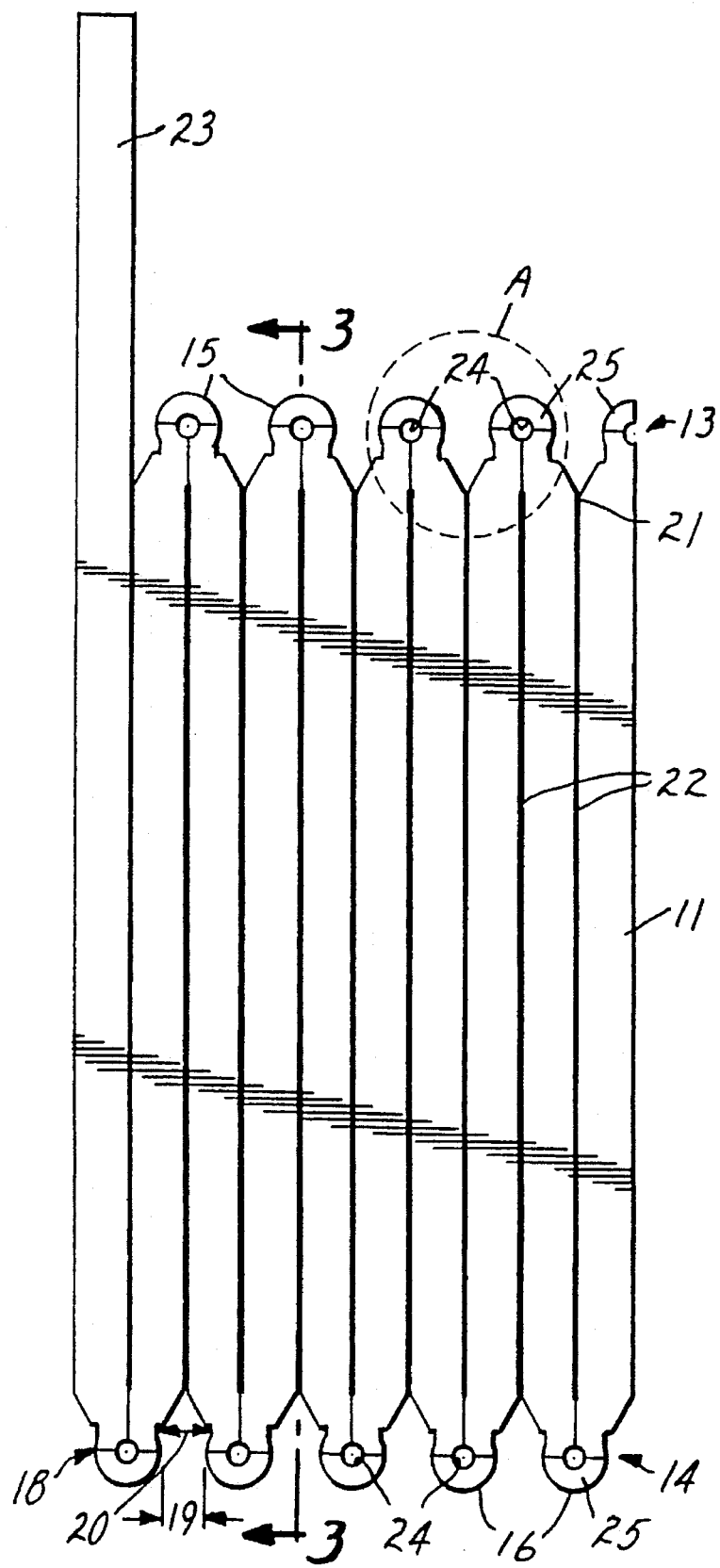
FIG. 2 is a plan view of a formed sheet adapted to produce the core of FIG. 1.
Figure 3:
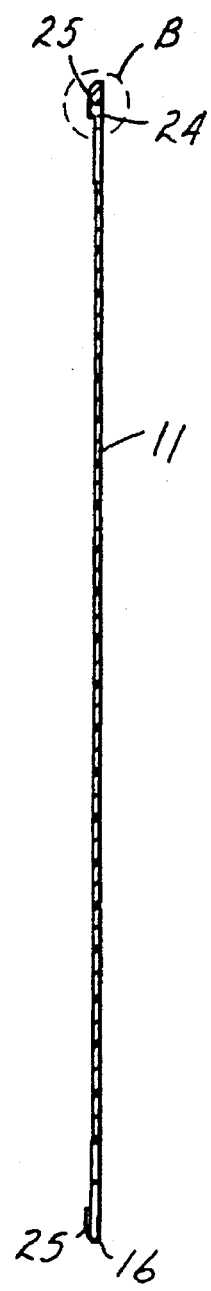
FIG. 3 is a cross-sectional view taken generally, along the line 3—3 of FIG. 2.
Figure 6:
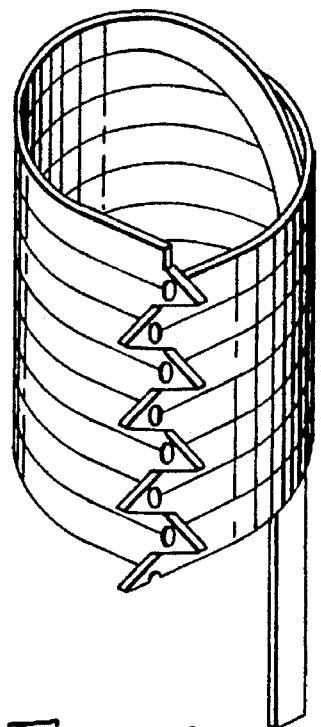
FIGS. 6 and 7 are perspective views of alternate embodiments of a removable PST core according to the present invention.
Figure 7:
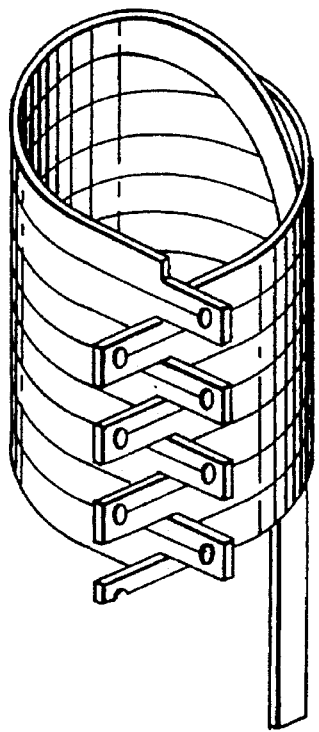

As shown in FIG. 2, multiple projections 15 and 16 are formed at regular intervals on opposite side edges 13 and 14 of the core sheet 11. The projections 15 on the side 13 are formed to be engaged by interlocking between adjacent projections 16 on the opposite side 14. The opposed projections 15 and 16 are matched to form a hollow cylindrical body 1 as shown in FIG. 1. The projections 15 and 16 are matched so that they will form an interlocking joint 12 and project outward from the outer surface of the body 1. Each of the projections 15 or 16 may have a circular (FIG. 1), triangular (FIG. 6), square (FIG. 7), or other shape.

Figure 4:
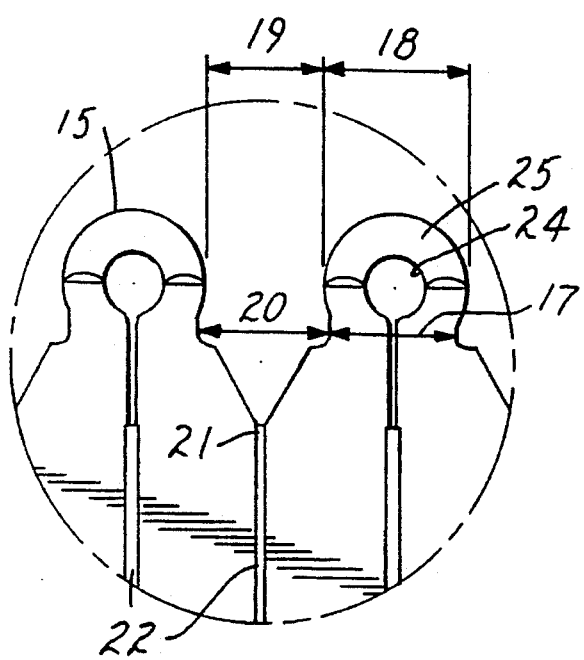
FIG. 4 is an enlarged view of a section A of FIG. 2.

In the embodiment of the present invention shown in FIGS. 1–5, and particularly with reference to FIG. 4, each of the projections 15 or 16 has a bulbous portion 18 that is wider than the width of a root 17 and which is located on the distal side of the root 17. The width of the bulbous portion 18 is larger than the distance 19 between the bulbous portions 18 of adjacent projections 15 or 16. The distance 20 between the roots 17 of adjacent projections 15 or 16 is identical to or larger than the width of the root 17 of the projection 15 or 16.

Each of projections 15 or 16 has the foregoing shape, and therefore, each of the projections 15 or 16 on one edge can be fitted into each interval between two adjacent projections 15 or 16 on the opposite edge. Due to the mutual support action among the bulbous sections 18, the resultant cylindrical shape can be maintained against the contraction force of a pre-stretched elastomeric tube. If the projections 15 or 16 have no bulbous section 18, as is the case with the embodiments shown in FIG. 6 or 7, each projection may be fixed by an adhesive or welded by heat or a solvent to the corresponding roots between projections disposed on the opposite edge.

Substantially parallel lines of local weakening 22 capable of being easily broken extend from a one edge to a point near, but short of, the opposite edge. Preferably the lines 22 extend from a midpoint 21 between two adjacent projections 15 or 16 to the center of each of the projections 15 or 16 located on the opposite edge of the sheet 11. The lines 22 thus define a free end 23 and a serpentine length or strip extending between and around adjacent lines 22.

The lines 22 are formed hot pressing, cutting or molding a groove in one or both sides of the sheet 11. In addition, the lines 22 may be perforated to further assist in breaking of the sheet 11 along the lines 22. It is essential, however, that a web of material be left intact across the lines of weakening 22 to connect adjacent segments of the core strip to maintain the integrity of the sheet 11 so that it is capable of supporting the forces generated by the PST stretched over the core 1.

A projection at the end of a sheet 11 is extended to form the free end 23 which is led back through the body of the cylindrical core 1. This end 23 may then be pulled after the PST has been mounted on the core 1 to remove the core 1 and allow the PST to contract and cover an object. As an alternative, to reduce the size of the sheet 11 from which the core 1 is formed, the free end 23 may terminate at the maximum extension of the projections 15 or 16. The free end 23 and a few lengths of the serpentine section of the core sheet 11 would then be pulled through the body of the core 1 before the core and the PST are mounted on the object to provide the length of core material required to provide a portion which may be grasped to initiate removal of the core 1 from the PST.

As shown in FIG. 4, which is an enlarged view of a section A of FIG. 2, each of the multiple projections 15 and 16 may be provided with an opening 24, approximately at its center, which intersects the lines of weakening 22. This opening 24 disperses the stress which is concentrated at the end of a return section and prevents the strip of core material from breaking. This opening 24 is preferably circular by may be any other shape, although sharp points are to be avoided.

Figure 5:
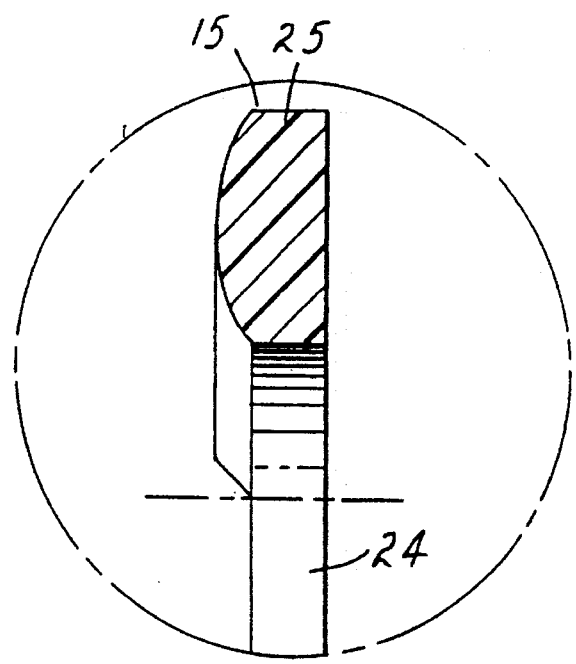
FIG. 5 is an enlarged view of section B of FIG. 3.

As shown in FIG. 5, an enlarged view of a section B of FIG. 2, each of multiple projections 15 and 16 may have a thickened portion 25 enclosing the circular opening 24. The thickened portion 25 reinforces the projection 15 or 16 and prevents the core strip from breaking. The thickened portion 25 may be made of the same or different material as the remainder of the sheet 11. To produce the thickened portion 25, a reinforcement material made from fibers may be included in or adhered to each projection.

The material of a PST core according to the present invention is not restricted, as long as the material can be shaped into a cylinder and is tough and flexible enough to be contorted as it is pulled out and strong enough to withstand the pull-out. Polypropylene, polyethylene, or other soft plastic is preferred. The thickness of a sheet preferably ranges from 0.1 to 10 mm, and most preferably, 0.5 to 2 mm. The width of the serpentine formed core strip or the interval between break lines 22 preferably ranges from 1 to 50 mm, and most preferably, 5 to 15 mm.

As a detailed example of a removable core 1, a polyethylene sheet 1 mm thick is punched using punch dies to produce a core sheet 11. The width of the core strip between lines 22 is 6 mm. The sheet 11 is shaped into a cylinder to create a core 1 having an inner diameter of 42 mm. Then, a PST rubber tube is attached to the core 1. In this state, the core 1 is tested to evaluate the pull-out workability of the core strip and the occurrence of a crushed core 1. The results are listed below:

| Type of Core | Pull-out workability | Occurrence of core crush[1] |
| --- | --- | --- |
| Comparative example 1 (spiral core) | entangled[2] | none |
| Comparative example 2 (conventional linear pull-out core) | good | crushed |
| Straight pull-out core of the present invention | good | none |

[1]The occurrence of a crushed core is evaluated after a core that has been provided with a PST tube is aged in a 70° C. oven for one week.
[2]"Entangled" means that the core strip must have been rotated around the object to remove the core.

The above results reveal that the removable PST core of the present invention has overcome the drawbacks of conventional cores.

Figure 8:
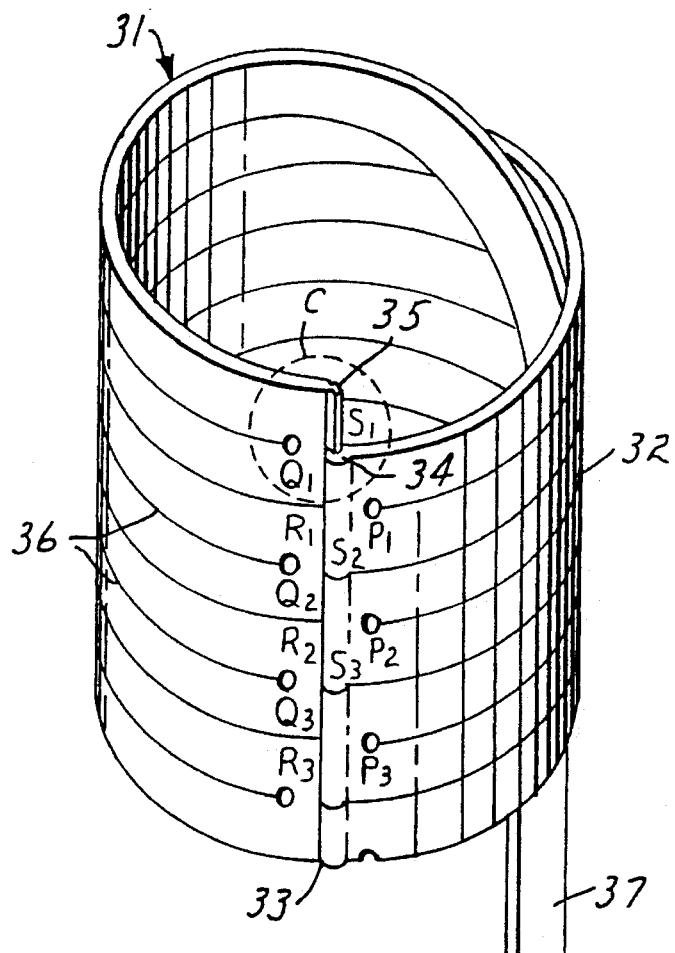
FIG. 8 is a perspective view of yet another embodiment of a removable core according to the present invention.
Figure 9:
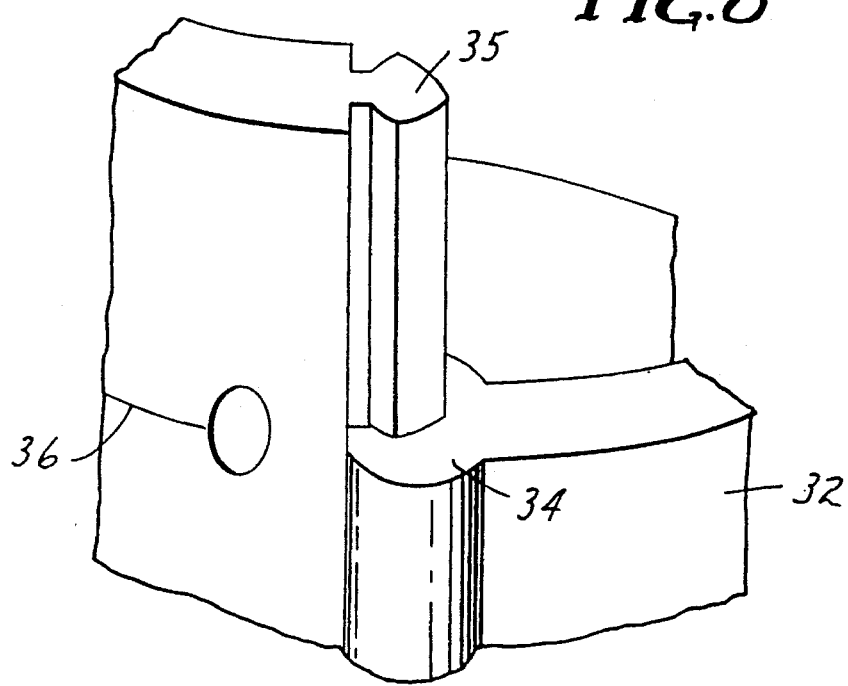
FIG. 9 is an enlarged perspective view of section C of FIG. 8.
Figure 10:
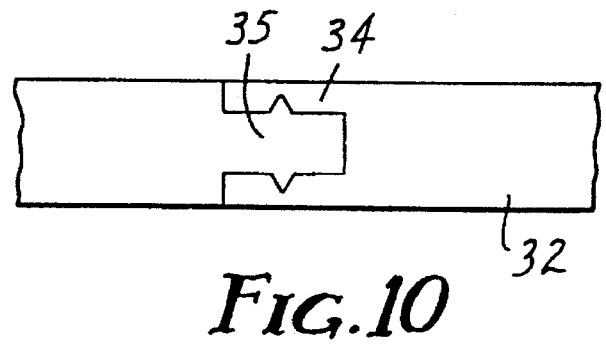
FIGS. 10–13 are schematic representations of alternate interlocking joint arrangements which may be used with the removable core of FIG. 8.
Figure 11:
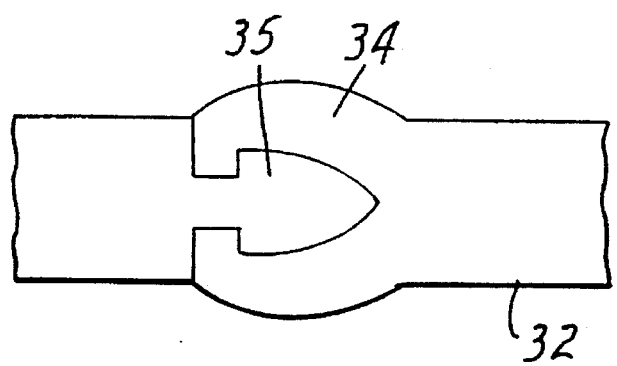
Figure 12:
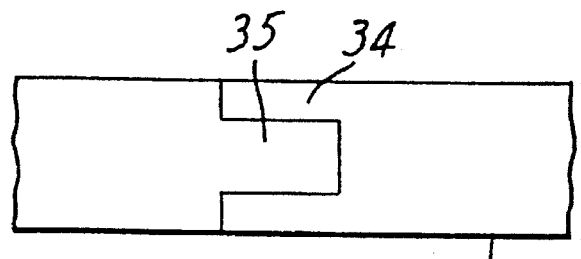
Figure 13:
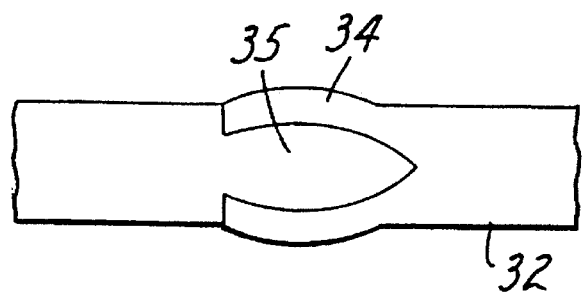

FIG. 8 is a perspective view of another embodiment of a removable PST core 31 according to the present invention. FIG. 9 is an enlarged view of a section C of FIG. 8. The core 31 has a hollow cylindrical body 32 formed by complementarily engaging fittings formed in opposite edges of a rectangular (or square) flexible sheet. The fittings are created by molding or cutting a female engagement socket 34 in one of the edges of the sheet and a male projection 35 extending from the opposite edge. Lines of weakening 36 have starting points P1, P2, P3 and Q1, Q2, Q3 which extend from a point near but spaced from one edge of the sheet in the vicinities of the female and male fitting sections 34 and 35 to points R1, R2, R3 and S1, S2, S3 at and through the opposite edge of the sheet at the male and female engagement sections 34 and 35. The lines of weakening 36 are formed as described above and are arranged at regular intervals and linearly in the circumferential direction. When the cylindrical body 32 is to be broken and removed, the applied stress must be dispersed. Therefore, preferably, circular openings are formed to communicate with the lines 36 at the start points P1, P2, P3 and Q1, Q2, Q3. These start points of successive lines 36 are arranged to begin from alternate sides of the fittings 34 and 35. For example, P1 and Q2 are located so as to oppose each other across the fittings 34 and 35.

A pull-out strip 37 is provided to extend from the engagement section 33 through the body of the removable core 31 in the axial direction of the body. The shapes of the female and male engagement sections 34 and 35 are not limited to any particular shapes, and FIGS. 10 through 13 show cross sections of other embodiments which present other shapes which may be used for the fitting. The female and male engagement sections 34 and 35 may be reinforced by heat, sonic or solvent welding or with an adhesive. Also, the female and/or male engagement section may be reinforced to withstand the contracting force of a PST by forming a thickened section or a reinforcement section made of another material, such as reinforced plastic fibers, nearby. In the embodiments of FIGS. 8 through 13, the cylindrical body or at least the female engagement sections must be made of relatively elastic material so that the engagement sections will be easily engaged to form a cylinder and easily disengaged to permit a pull-out of the core.

We claim:

1. A removable core for supporting a pre-stretched elastomeric tube in a radially-expanded condition comprising:

a flexible sheet having opposite edges which include means for interlocking said opposite edges to maintain said sheet in a cylinder;

said sheet having a series of substantially parallel lines of localized weakening extending from one of said opposite edges to a point near but short of the other of said opposite edges, with successive lines extending from alternate edges of said sheet to define a strip beginning at a free end and continuing in a serpentine length between and around consecutive lines;

so that pulling said free end will cause said strip to separate along said lines and permit said core to be removed from said tube without coiling of said strip.

2. A removable core according to claim 1 wherein said means for interlocking said opposite edges comprises a plurality of projections extending from said edges of said sheet at substantially equal intervals and wherein said projections of one of said edges fit between said projections of the other of said edges to interlock said edges and said cylinder and wherein said lines extend from a point in said projection of one of said edges to a point between two of said projections on the other of said edges.

3. A removable core according to claim 2, wherein each of the projections has a generally circular shape.

4. A removable core according to claim 3, wherein each of said projections has a root and a bulbous portion positioned distal from said root of the projection, said bulbous portion having a width wider than the distance between said bulbous portion of one of said projections and said bulbous portion of an adjacent projection, with the width of said root of said projection being the same as, or narrower than, the distance between the root of one of said projections and said root of an adjacent projection.

5. A removable core according to claim 3, wherein each of said projections has an opening positioned generally centrally of the projection with said opening contacting said line of weakening.

6. A core for a PST according to claim 3, wherein each of the projections has at its tip portion a thickened portion for reinforcement.

7. A removable core according to claim 1 wherein said means for interlocking said opposite edges comprises complimentarily engaging fittings.

8. A removable core according to claim 7 wherein said fittings comprise a projection extending from one of said opposite edges and a socket adapted to accept said projection disposed in the other of said opposite edges.

\* \* \* \* \*